United States Patent
Xiao et al.

(10) Patent No.: US 10,101,434 B2
(45) Date of Patent: Oct. 16, 2018

(54) POSITIONING METHOD, CONTROL DEVICE, AND MOBILE COMMUNICATIONS SYSTEM

(71) Applicant: Huawei Technologies Co., Ltd., Shenzhen (CN)

(72) Inventors: Dengkun Xiao, Beijing (CN); Jie Cui, Beijing (CN); Liji Wu, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 184 days.

(21) Appl. No.: 14/606,793

(22) Filed: Jan. 27, 2015

(65) Prior Publication Data

US 2015/0133157 A1 May 14, 2015

Related U.S. Application Data

(63) Continuation of application No. PCT/CN2013/080250, filed on Jul. 27, 2013.

(30) Foreign Application Priority Data

Jul. 27, 2012 (CN) .......................... 2012 1 0264072

(51) Int. Cl.
*G01S 5/06* (2006.01)
*H04W 4/02* (2018.01)
(Continued)

(52) U.S. Cl.
CPC .............. *G01S 5/06* (2013.01); *G01S 5/0036* (2013.01); *G01S 5/0263* (2013.01); *G01S 5/12* (2013.01); *H04W 4/02* (2013.01)

(58) Field of Classification Search
CPC ......... H04W 64/00; H04W 4/22; H04W 4/02; G01S 5/06; G01S 5/0036; G01S 5/0263; G01S 5/12
(Continued)

(56) References Cited

U.S. PATENT DOCUMENTS

| 7,680,512 B2 | 3/2010 | Silverbrook et al. |
| 2005/0186967 A1 | 8/2005 | Ozluturk |

(Continued)

FOREIGN PATENT DOCUMENTS

| CN | 1922898 A | 2/2007 |
| CN | 101286808 A | 10/2008 |

(Continued)

OTHER PUBLICATIONS

"3rd Generation Partnership Project; Technical Specification Group Radio Access Network; Evolved Universal Terrestrial Radio Access (E-UTRA); Base Station (BS) Radio Transmission and Reception (Release 11)," 3GPP TS 36.104 V11.1.0, Jul. 2012, 121 pages.

(Continued)

*Primary Examiner* — Kamran Afshar
*Assistant Examiner* — Farid Seyedvosoghi
(74) *Attorney, Agent, or Firm* — Slater Matsil, LLP

(57) ABSTRACT

Embodiments provide a positioning method, a control device, and a mobile communications system. A control device receives a first positioning measurement parameter used for positioning a user equipment (UE). The first positioning measurement parameter is received through one communications system interface or multiple communications system interfaces among N communications system interfaces supported by the control device. The control device positions the UE according to the received first positioning measurement parameter.

11 Claims, 11 Drawing Sheets

A control device receives, through one communications system interface or multiple communications system interfaces among N communications system interfaces supported by the control device, a first positioning measurement parameter used for positioning a user equipment UE, where the first positioning measurement parameter is sent to the control device by one communications system or multiple communications systems among N communications systems that communicate with the control device, and an $i^{th}$ communications system interface among the N communications system interfaces corresponds to an $i^{th}$ communications system among the N communications systems — S101

The control device positions the UE according to the received first positioning measurement parameter — S102

(51) Int. Cl.
*G01S 5/00* (2006.01)
*G01S 5/02* (2010.01)
*G01S 5/12* (2006.01)

(58) Field of Classification Search
USPC .............................. 455/456.1, 456.5, 2, 3, 4
See application file for complete search history.

(56) References Cited

U.S. PATENT DOCUMENTS

| | | | | |
|---|---|---|---|---|
| 2007/0049286 | A1* | 3/2007 | Kim | G01S 5/0252 455/456.1 |
| 2007/0285308 | A1* | 12/2007 | Bauregger | G01S 19/10 342/357.27 |
| 2010/0240392 | A1* | 9/2010 | Gerstenberger | G01S 5/0009 455/456.1 |
| 2011/0269477 | A1* | 11/2011 | Annamalai | H04W 8/02 455/456.1 |
| 2012/0129550 | A1* | 5/2012 | Hannan | G01S 5/0036 455/456.1 |
| 2012/0149392 | A1* | 6/2012 | Siomina | H04W 64/00 455/456.1 |
| 2013/0040659 | A1* | 2/2013 | Van Der Velde | H04W 24/10 455/456.1 |
| 2013/0040673 | A1* | 2/2013 | Siomina | G01S 5/0226 455/501 |

FOREIGN PATENT DOCUMENTS

| | | |
|---|---|---|
| CN | 101998231 A | 3/2011 |
| CN | 102014429 A | 4/2011 |
| WO | 0161373 A1 | 8/2001 |

OTHER PUBLICATIONS

"3rd Generation Partnership Project; Technical Specification Group Radio Access Network; Evolved Universal Terrestrial Radio Access (E-UTRA); Requirements for Support of Radio Resource Management (Release 11)," 3GPP TS 36.133 V11.1.0, Jun. 2012, 652 pages.

"3rd Generation Partnership Project; Technical Specification Group Radio Access Network; Evolved Universal Terrestrial Radio Access (E-UTRA); Physical Channels and Modulation (Release 10)," 3GPP TS 36.211 V10.5.0, Jun. 2012, 101 pages.

* cited by examiner

POSITIONING METHOD, CONTROL DEVICE, AND MOBILE COMMUNICATIONS SYSTEM

This application is a continuation of International Application No. PCT/CN2013/080250, filed on Jul. 27, 2013, which claims priority to Chinese Patent Application No. 201210264072.8, filed on Jul. 27, 2012, both of which are hereby incorporated by reference in their entireties.

TECHNICAL FIELD

The present invention belongs to the field of wireless communication technologies, and in particular, relates to a positioning method, a control device, and a mobile communications system.

BACKGROUND

A positioning technology is a technology used to determine a geographical location of a mobile station (also called a user equipment or UE). Location information of the mobile station can be directly or indirectly obtained by using resources of a wireless communications network. Generally, there are the following positioning manners:

1. Network-assisted global navigation satellite system (GNSS) positioning
2. Downlink positioning (in a manner of an observed time difference of arrival (OTDOA))
3. Enhanced cell identity (enhanced Cell ID, e-CID) positioning
4. Radio frequency pattern matching (RFPM) positioning Generally, an algorithm for positioning a mobile station in a Long Term Evolution (Long term evolution, LTE) mobile communications system can detect characteristic parameters (such as signal field strength, a time difference of arrival of propagated signals, and an angle of arrival of a signal) of a radio wave propagation signal transmitted between the mobile station and a base station, and then a geometric location of a mobile terminal is estimated according to a relevant positioning algorithm. In a positioning method of the GNSS, the mobile station is required to have a wireless receiver for receiving a GNSS signal, and specific implementation of the GNSS includes GPS positioning, Galileo positioning, and the like. Both the downlink positioning and the e-CID positioning are a type of network positioning and a current research focus. They mainly rely on detection of characteristic parameters of wireless resources in a mobile communications system, and then estimate a location of a mobile station according to a positioning algorithm. In OTDOA positioning, downlink positioning reference signals from multiple base stations are received and measured periodically by using a mobile station, a time difference of arrival of positioning reference signals (positioning reference signal, PRS) between the base stations is reported, and calculation is performed on a network control device to obtain a geographical location of the mobile station. RFPM positioning is to compare a parameter that is measured in advance and stored in a database with a parameter that is reported during user measurement, so as to obtain a corresponding coordinate, where the coordinate indicates a location of a mobile station.

For a requirement of positioning precision, the Federal Communications Commission (FCC) of the United States of America released the E-911 regulation in 1996, requesting that wireless cellular systems of various telecommunication operators in the United States of America should be able to provide, before Oct. 1, 2001, a positioning service with precision within 125 m for a mobile station initiating an E-911 emergency call, and a probability of meeting this positioning precision should be no lower than 67%. In 1998, the FCC again put forward a service requirement, with positioning precision of 400 m and accuracy no lower than 90%. In 1999, the FCC put forward a new requirement for the positioning precision: for network-based positioning, 67% of the positioning precision should be within 100 m, and 95% of the positioning precision should be within 300 m; and for mobile-station-based positioning, 67% of the positioning precision should be within 50 m, and 95% of the positioning precision should be within 150 m.

Currently, with continuous development of mobile communications technologies, requirements for the positioning service are ever increasing. Application scenarios of the positioning service tend to be diversified, such as positioning for emergency rescue, tracking of a position of crime, navigation, and transportation control. A positioning requirement in the industry is always a hope for obtaining a reliable, effective, and fast method, no matter how diversified the application scenarios are. In other words, a positioning technology easy to implement with high precision is always in hot pursuit of people. Currently, a user equipment is generally capable of bearing services of multiple wireless networks, such as 2G/3G/LTE, and a wireless network also tends to have a vertical layout. However, UE positioning solutions provided in the prior art are applicable to a wireless network environment that involves only one standard, but are not applicable to an environment with multiple wireless networks.

SUMMARY

Embodiments of the present invention provide a positioning method, a control device, and a mobile communications system, aiming to resolve a problem that UE positioning solutions provided in the prior art are not applicable to an environment with multiple wireless networks.

In one aspect, a positioning method is provided. The method includes receiving, by a control device, through one communications system interface or multiple communications system interfaces among N communications system interfaces supported by the control device, a first positioning measurement parameter used for positioning a user equipment UE, where the first positioning measurement parameter is sent to the control device by one communications system or multiple communications systems among N communications systems that communicate with the control device, and an $i^{th}$ communications system interface among the N communications system interfaces corresponds to an $i^{th}$ communications system among the N communications systems; and positioning, by the control device, the UE according to the received first positioning measurement parameter.

In another aspect, a control device is provided. The control device includes: a communications system interface, connected to at least one communications system among N communications systems, and configured to receive a first positioning measurement parameter used for positioning a user equipment UE, where the first positioning measurement parameter is sent to the control device by one communications system or multiple communications systems among the N communications systems that communicate with the control device, and an $i^{th}$ communications system interface among N communications system interfaces corresponds to an $i^{th}$ communications system among the N communications systems; and a positioning unit, configured to position the UE according to the first positioning measurement parameter that is received through the communications system interface.

In still another aspect, a mobile communications system is provided, and includes radio resource managers of networks of multiple standards. The mobile communications system further includes the foregoing control device, which is connected to the radio resource managers of the networks of the multiple standards, respectively.

In the embodiments of the present invention, when a location of a UE is calculated, a control device receives, through one communications system interface or multiple communications system interfaces among N communications system interfaces supported by the control device itself, a first positioning measurement parameter used for positioning the user equipment UE, and then positions the UE according to the first positioning measurement parameter. Because various communications system interfaces correspond to wireless networks of different standards, in an environment with multiple wireless networks, relevant algorithms in the wireless networks of various standards can be coordinated, so as to more effectively utilize network resources and improve network performance.

DETAILED DESCRIPTION OF ILLUSTRATIVE EMBODIMENTS

To make the objectives, technical solutions, and advantages of the present invention more comprehensible, the following further describes the present invention in detail with reference to the accompanying drawings and embodiments. It should be understood that the specific embodiments described herein are merely used for describing the present invention, but are not intended to limit the present invention.

In the embodiments of the present invention, when a location of a UE is calculated, a control device receives, through one communications system interface or multiple communications system interfaces among N communications system interfaces supported by the control device itself, a first positioning measurement parameter used for positioning the user equipment UE, and then positions the UE according to the first positioning measurement parameter.

The following describes in detail implementation of the present invention with reference to specific embodiments.

Embodiment 1

Figure 1:
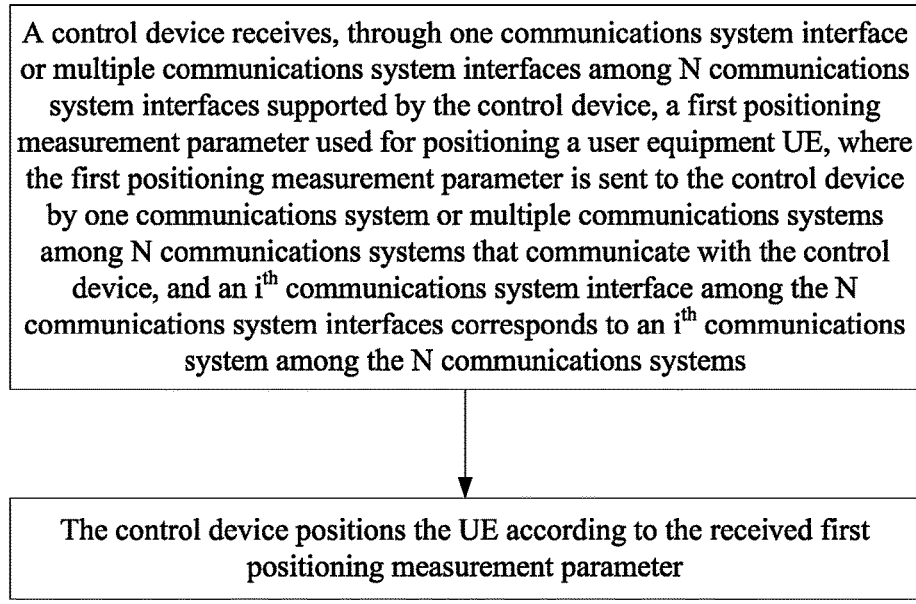
FIG. 1 is a flowchart of implementation of a positioning method provided in Embodiment 1 of the present invention.

FIG. 1 shows a flowchart of implementation of a positioning method provided in Embodiment 1 of the present invention. Details are as follows.

In step S101, a control device receives, through one communications system interface or multiple communications system interfaces among N communications system interfaces supported by the control device, a first positioning measurement parameter used for positioning a user equipment UE, where the first positioning measurement parameter is sent to the control device by one communications system or multiple communications systems among N communications systems that communicate with the control device, and an $i^{th}$ communications system interface among the N communications system interfaces corresponds to an $i^{th}$ communications system among the N communications systems.

In this embodiment, the first positioning measurement parameter used for positioning the user equipment UE may be a measurement parameter supported by the UE itself, that is, a value of a positioning measurement parameter obtained by the UE through measurement. The measurement parameter may include a parameter in a GSM system, a 3G system, an LTE system, or a next-generation network system, and specifically includes: reference signal received power (Reference Signal Received Power, RSRP), reference signal received quality (Reference Signal Received Quality, RSRQ), received signal strength (Received Signal Strength Indicator_Universal Terrestrial Radio Access, RSSI_UTRA) of a 3G system, received signal code power (Received Signal Code Power, RSCP), a signal-to-noise ratio Ec/No, a received signal strength indicator (Received Signal Strength Indicator_GSM EDGE Radio Access Network, RSSI_G-ERAN) of an enhanced data rate GSM evolved network, a transmit-receive time difference (Rx-Tx)_GERAN of an enhanced data rate GSM evolved network, a UE transmit-receive time difference (Rx-Tx)_UTRA of a 3G system, a UE transmit-receive time difference (Rx-Tx)_EUTRA of an LTE system, a UE transmit-receive time difference (Rx-Tx)_NG of a next-generation network, a reference signal time difference (Reference Signal Time Difference, RSTD), and a transmit-receive time difference Rx-Tx of the UE.

In this embodiment, when the positioning measurement parameter obtained by the UE through the measurement includes the RSRP, RSRQ, RSSI_UTRA, RSCP, Ec/No, RSSI_GERAN, (Rx-Tx)_GERAN, (Rx-Tx)_UTRA, (Rx-Tx)_EUTRA, and (Rx-Tx)_NG, or when the measurement parameter is the RSTD, the control device may calculate a location of the UE according to the value of the measurement parameter.

In this embodiment, the first positioning measurement parameter may further be the value of the positioning measurement parameter obtained by the UE through the measurement and an AOA obtained by a base station through measurement. When the positioning measurement parameter obtained by the UE through the measurement is the Rx-Tx, the control device may calculate the location of the UE according to a value of the Rx-Tx and the angle of arrival AOA that is obtained by the base station through the measurement. The value of the Rx-Tx is obtained by the UE through the measurement. The UE may report, by using LTE positioning protocol A (LTE positioning protocol A, LPPa) signaling, the value of the Rx-Tx obtained through the measurement to the base station, and then the base station forwards the value of the Rx-Tx to a timing server; or the UE may directly send, by using LTE positioning protocol (LTE positioning protocol, LPP) signaling, the value of the measurement parameter to the base station, and then the base station transparently transmits the value of the measurement parameter to the control device. The transparent transmission means that the base station does not parse a data packet that includes the value of the measurement parameter, but the base station is transparent to the data packet and directly delivers the data packet to the control device; and the forwarding means that the base station parses the data packet, then re-packetizes the packet according to a signaling format between the base station and the server, and uploads the re-packetized packet to the control device.

In this embodiment, the first positioning measurement parameter may further be an identity of a base station that serves the UE, or an identity of a UE served by the base station and reported by the base station, where the identity of the base station is reported by the UE. The control device may directly use, according to an ID of a cell in which the UE resides, a location of a base station that serves the UE with minimum coverage as the location of the UE.

Figure 2:
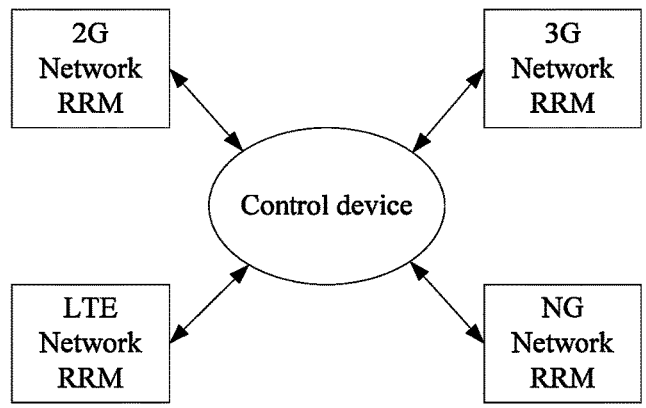
FIG. 2 is a schematic diagram of connection relationships between a radio resource management server RRMS and radio resource managers on core networks of various standards provided in an embodiment of the present invention.

Specifically, the control device may be an entity inside a radio resource management server (Radio Resource Management Server, RRMS) or inside a coordination controller, or a radio resource management server. The control device includes N communications system interfaces, and is capable of receiving, through one or more of the communications system interfaces, the first positioning measurement parameter for positioning the user equipment UE, where the first positioning measurement parameter is sent to the control device by one communications system or multiple communications systems among N communications systems that communicate with the control device, and the $i^{th}$ communications system interface among the N communications system interfaces corresponds to the $i^{th}$ communications system among the N communications systems. Specifically, the control device is connected, through different communications system interfaces, to radio resource managers in mobile communications systems of various standards. FIG. 2 shows connection relationships between the control device and radio resource managers on core networks of various standards. The radio resource managers connected to the control device may include a 2G Network RRM, a 3G Network RRM, an LTE 2G Network RRM, and an NG 2G Network RRM. The RRMS may also be abbreviated as RRM SERVER, and may also be called a wireless network performance enhancer. Its role is to coordinate relevant algorithms used on various wireless networks, so as to more efficiently utilize network resources and improve network performance.

Further, the control device may further include a UE interface. The control device may receive, through the UE interface supported by the control device, a second positioning measurement parameter used for positioning the user equipment UE, where the second positioning measurement parameter is sent to the control device by the UE that communicates with the control device, and the second positioning measurement parameter is a value of a positioning measurement parameter obtained by the UE through measurement.

Specifically, before the control device receives, through the UE interface supported by the control device, the second positioning measurement parameter used for positioning the user equipment UE, the method may further include the following step: sending, by the control device through the UE interface, signaling to the UE, so as to command the UE to measure the second positioning measurement parameter.

Further, the communications system includes a core network, a mobility management entity MME, and a base station; and before the control device receives, through the one communications system interface or the multiple communications system interfaces among the N communications system interfaces supported by the control device, the first positioning measurement parameter used for positioning the user equipment UE, the method further includes the following steps:

Step a: The control device receives a request message sent by the mobility management entity MME, where the request message is sent by the core network to the MME by using high-layer signaling.

Step b: The control device sends signaling to the base station according to the request message, so as to command the base station to instruct the UE to measure the first positioning measurement parameter.

Further, the communications system includes a core network and a base station; and before the control device receives, through the one communications system interface or the multiple communications system interfaces among the N communications system interfaces supported by the control device, the first positioning measurement parameter used for positioning the user equipment UE, the method further includes the following steps:

Step a1: The control device receives a positioning requirement message sent by the base station, where the positioning requirement message is sent by the core network to the base station by using high-layer signaling.

Step b1: The control device sends a measurement mode to the base station according to the positioning requirement message, so that the base station commands the UE to be positioned to measure a corresponding positioning measurement parameter according to the measurement mode.

Further, the communications system includes a core network, a mobility management entity MME, and a base station; and before the control device receives, through the one communications system interface or the multiple communications system interfaces among the N communications system interfaces supported by the control device, the first positioning measurement parameter used for positioning the user equipment UE, the method further includes the following steps:

Step a2: The control device receives a positioning service request sent by the MME, where the positioning service request is sent by the core network to the MME by using high-layer signaling.

Step b2: The control device sends signaling to the base station according to the positioning service request.

Step c2: The control device receives a positioning requirement message sent by the base station.

Step d2: The control device sends measurement configuration to the base station according to the positioning requirement message, so that the base station measures an angle of arrival AOA according to the measurement configuration, and at the same time the base station commands the UE to be positioned to measure a corresponding positioning measurement parameter according to the measurement configuration.

In step S102, the control device positions the UE according to the received first positioning measurement parameter.

In this embodiment, when the positioning measurement parameter obtained by the UE through the measurement includes the reference signal received power RSRP, the reference signal received quality RSRQ, the received signal strength RSSI_UTRA of a 3G system, the received signal code power RSCP, the signal-to-noise ratio Ec/No, the received signal strength indicator RSSI_GERAN of an enhanced data rate Global System for Mobile Communications GSM evolved network, the transmit-receive time difference (Rx-Tx)_GERAN of an enhanced data rate GSM evolved network, the UE transmit-receive time difference (Rx-Tx)_UTRA of a 3G system, the UE transmit-receive time difference (Rx-Tx)_EUTRA of an LTE system, and the UE transmit-receive time difference (Rx-Tx)_NG of a next-generation network, the positioning, by the control device, the UE according to the received first positioning measurement parameter is specifically: calculating, by the control device, the location of the UE according to a radio frequency pattern matching RFPM positioning algorithm.

When the positioning measurement parameter obtained by the UE through the measurement is the reference signal time difference RSTD, the positioning, by the control device, the UE according to the received first positioning measurement parameter is specifically: calculating, by the control device, the location of the UE according to an observed time difference of arrival OTDOA positioning algorithm.

When the positioning measurement parameter obtained by the UE through the measurement is the transmit-receive time difference (Rx-Tx) of the UE, the positioning, by the control device, the UE according to the received first positioning measurement parameter is specifically: calculating, by the control device, the location of the UE according to an enhanced cell identity e-CID positioning algorithm.

In this embodiment, a control device receives, through one communications system interface or multiple communications system interfaces among N communications system interfaces supported by the control device itself, a first positioning measurement parameter used for positioning a user equipment UE, and then positions the UE according to the first positioning measurement parameter. Because various communications system interfaces correspond to wireless networks of different standards, in an environment with multiple wireless networks, relevant algorithms in the wireless networks of various standards can be coordinated, so as to more effectively utilize network resources and improve network performance. In addition, the control device further includes a UE interface, and can also receive, through the UE interface, the first positioning measurement parameter for positioning the user equipment UE, and then positions the UE according to the first positioning measurement parameter. In a case where the communications system interfaces are faulty, the first positioning measurement parameter can be received through the UE interface so as to implement the positioning of the UE, thereby enhancing security of the control device.

Embodiment 2

Figure 3:
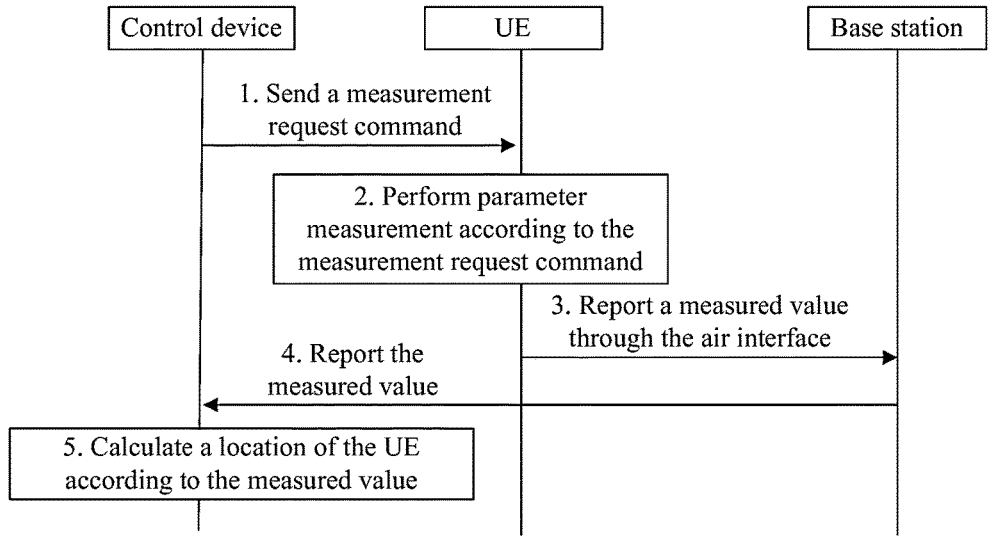
FIG. 3 is a flowchart of implementation of a positioning method provided in Embodiment 2 of the present invention.

FIG. 3 shows a flowchart of implementation of a positioning method provided in Embodiment 2 of the present invention. The method may be applied to a wireless communications system that includes mobile communication networks of various standards, the wireless communications system includes a UE and a core network, and the core network includes radio resource managers and base stations of various standards. The method is an RFPM method based on cascading reporting of the UE. A control device is an entity inside a radio resource management server RRMS or inside a coordination controller. Details are as follows:

Step 1: The control device sends a measurement request command to the UE.

In this embodiment, the control device sends the measurement request command to the UE by using LPP signaling, so as to command the UE to measure a measurement parameter supported by the UE itself. The measurement parameter includes: RSRP, RSRQ, RSSI_UTRA, RSCP, Ec/No, RSSI_GERAN, (Rx-Tx)_GERAN, (Rx-Tx)_UTRA, (Rx-Tx)_EUTRA, and (Rx-Tx)_NG.

Step 2: The UE performs parameter measurement according to the measurement request command.

Step 3: The UE reports a measured value to a base station through an air interface.

Step 4: The base station reports the measured value to the control device.

In this embodiment, the base station reports the measured value to the control device by using LPPa signaling, or the UE directly reports the measured value to the control device by using LPP signaling.

Step 5: The control device calculates a location of the UE according to the measured value.

In this embodiment, the control device calculates the location of the UE according to the radio frequency pattern matching RFPM positioning method. Specifically, a corresponding signal characteristic may be recorded, through a vehicle-mounted drive test system, for each location on a network, so as to construct a matching table; and then the location of the UE is obtained through matching according to the matching table and the measured value that is reported by the UE.

Embodiment 3

Figure 4:
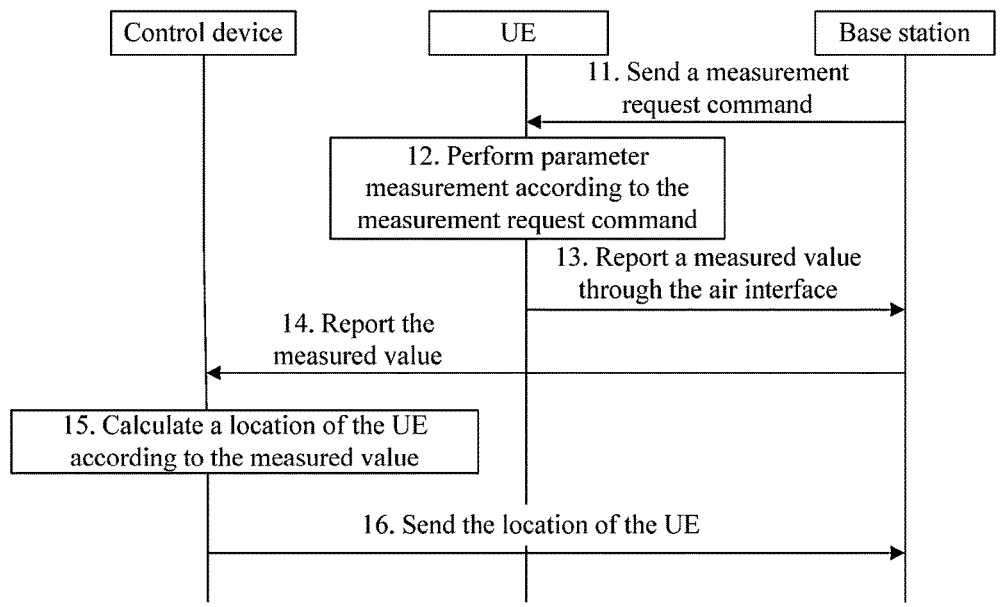
FIG. 4 is a flowchart of implementation of a positioning method provided in Embodiment 3 of the present invention.

FIG. 4 shows a flowchart of implementation of a positioning method provided in Embodiment 3 of the present invention. The method may be applied to a wireless communications system that includes mobile communication networks of various standards, the wireless communications system includes a UE and a core network, and the core network includes radio resource managers and base stations of various standards. The method is an RFPM method based on cascading reporting of the UE. A control device is an entity in the radio resource managers of various standards. Details are as follows.

Step 11: A base station sends a measurement request command to the UE.

In this embodiment, the base station sends the measurement request command to the UE, so as to command the UE to measure a measurement parameter supported by the UE itself. The measurement parameter includes: RSRP, RSRQ, RSSI_UTRA, RSCP, Ec/No, RSSI_GERAN, (Rx-Tx)_GERAN, (Rx-Tx)_UTRA, (Rx-Tx)_EUTRA, and (Rx-Tx)_NG.

Step 12: The UE performs parameter measurement according to the measurement request command.

Step 13: The UE reports a measured value to the base station through an air interface.

Step 14: The base station reports the measured value to the control device.

In this embodiment, the base station reports the measured value to the control device by using LPPa signaling, or the UE directly reports the measured value to the control device by using LPP signaling.

Step 15: The control device calculates a location of the UE according to the measured value.

In this embodiment, the control device calculates the location of the UE according to the radio frequency pattern matching RFPM positioning method.

Step 16: Send the location of the UE to the base station.

Embodiment 4

Figure 5:
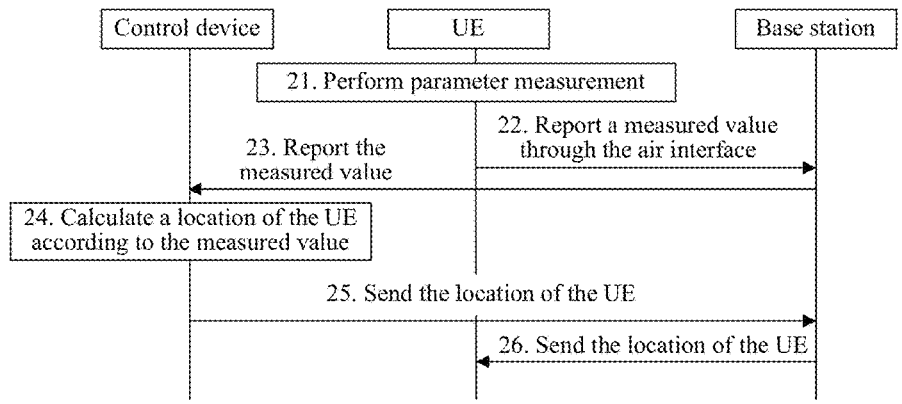
FIG. 5 is a flowchart of implementation of a positioning method provided in Embodiment 4 of the present invention.

FIG. 5 shows a flowchart of implementation of a positioning method provided in Embodiment 4 of the present invention. The method may be applied to a wireless communications system that includes mobile communication networks of various standards, the wireless communications system includes a UE and a core network, and the core network includes radio resource managers and base stations of various standards. The method is an RFPM method based on cascading reporting of the UE. A control device is an entity in the radio resource managers of various standards. Details are as follows.

Step 21: The UE performs parameter measurement.

In this embodiment, a parameter that needs to be measured includes: RSRP, RSRQ, RSSI_UTRA, RSCP, Ec/No, RSSI_GERAN, (Rx-Tx)_GERAN, (Rx-Tx)_UTRA, (Rx-Tx)_EUTRA, and (Rx-Tx)_NG.

Step 22: The UE reports a measured value to a base station through an air interface.

Step 23: The base station reports the measured value to the control device.

In this embodiment, the base station reports the measured value to the control device by using LPPa signaling, or the UE directly reports the measured value to the control device by using LPP signaling.

Step 24: The control device calculates a location of the UE according to the measured value.

In this embodiment, the control device calculates the location of the UE according to the radio frequency pattern matching RFPM positioning method.

Step 25: Send the location of the UE to the base station.

Step 26: The base station sends the location of the UE to the UE.

Embodiment 5

Figure 6:
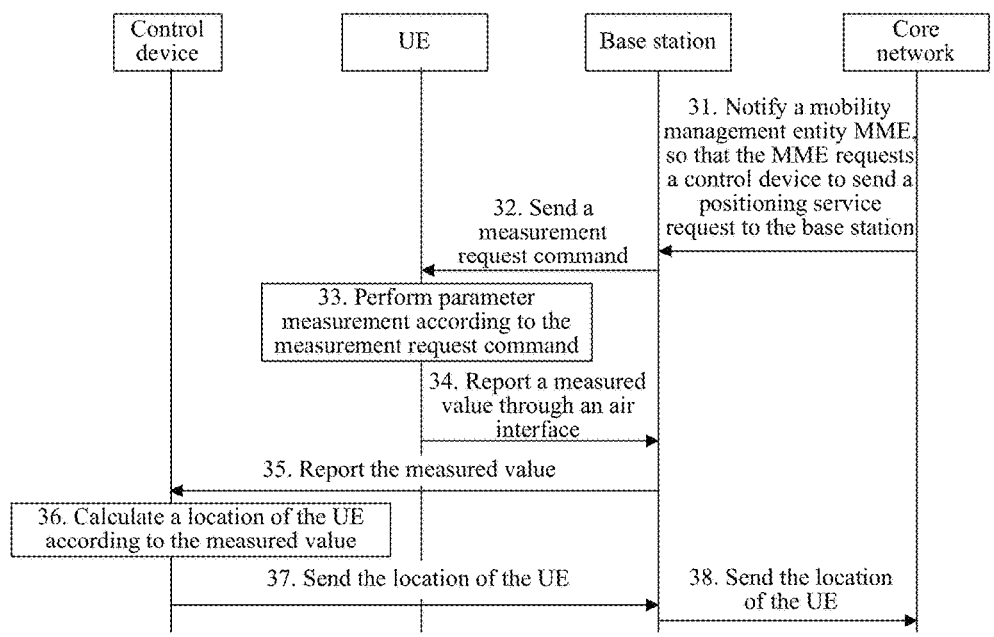
FIG. 6 is a flowchart of implementation of a positioning method provided in Embodiment 5 of the present invention.

FIG. 6 shows a flowchart of implementation of a positioning method provided in Embodiment 5 of the present invention. The method may be applied to a wireless communications system that includes mobile communication networks of various standards, the wireless communications system includes a UE and a core network, and the core network includes radio resource managers and base stations of various standards. The method is an RFPM method based on cascading reporting of the UE. A control device is an entity in an RRMS. Details are as follows.

Step 31: The core network notifies a mobility management entity MME, and the MME requests the control device to send a positioning service request to a base station.

In this embodiment, the control device sends the positioning service request to the base station by using LPPa signaling.

Step 32: The base station sends a measurement request command to the UE.

In this embodiment, the base station sends the measurement request command to the UE, so as to command the UE to measure a measurement parameter supported by the UE itself. The measurement parameter includes: RSRP, RSRQ, RSSI_UTRA, RSCP, Ec/No, RSSI_GERAN, (Rx-Tx)_GERAN, (Rx-Tx)_UTRA, (Rx-Tx)_EUTRA, and (Rx-Tx)_NG.

Step 33: The UE performs parameter measurement according to the measurement request command.

Step 34: The UE reports a measured value to the base station through an air interface.

Step 35: The base station reports the measured value to the control device.

In this embodiment, the base station reports the measured value to the control device by using LPPa signaling, or the UE directly reports the measured value to the control device by using LPP signaling.

Step 36: The control device calculates a location of the UE according to the measured value.

In this embodiment, the control device calculates the location of the UE according to the radio frequency pattern matching RFPM positioning method.

Step 37: Send the location of the UE to the base station.

Step 38: The base station sends the location of the UE to the core network.

In this embodiment, the base station sends the location of the UE to the core network by using LPPa signaling.

In Embodiments 2, 3, 4, and 5 of the present invention, a control device, a base station, a UE, or a core network may initiate a positioning request, so as to command the UE to measure a corresponding parameter; and finally, the control device positions the UE according to a measurement result fed back by the base station. In this way, a positioning manner is diversified, a wide range of scenarios are applicable, and an RFPM method with cascading reporting of the UE is quite suitable.

Embodiment 6

Figure 7:
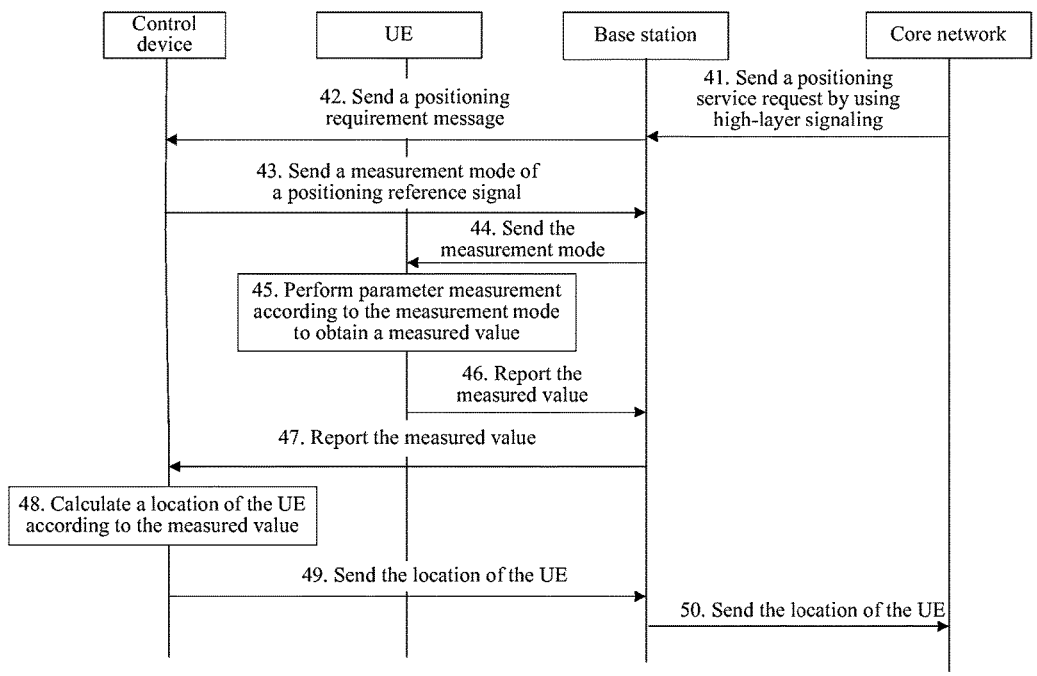
FIG. 7 is a flowchart of implementation of a positioning method provided in Embodiment 6 of the present invention.

FIG. 7 shows a flowchart of implementation of a positioning method provided in Embodiment 6 of the present invention. The method may be applied to a wireless communications system that includes mobile communication networks of various standards, the wireless communications system includes a UE and a core network, and the core network includes radio resource managers and base stations of various standards. The method is an OTDOA method based on an RRMS. A control device is an entity in the RRMS. Details are as follows:

Step 41: The core network sends a positioning service request to a base station by using high-layer signaling.

Step 42: The base station sends a positioning requirement message to the control device.

Step 43: The control device sends a measurement mode of a positioning reference signal (Positioning Reference Signal, PRS) to the base station.

Step 44: The base station sends the measurement mode to the UE to be positioned.

Step 45: The UE performs parameter measurement according to the measurement mode to obtain a measured value, where a measured parameter is a reference signal time difference (Reference Signal Time Difference, RSTD).

The measurement mode indicates transmit timing of a PRS and a transmit sequence of the PRS. The UE may parse a first-arrival path of the PRS from the measurement mode. A timing difference between first-arrival paths of two PRSs is the reference signal time difference RSTD.

Step 46: The UE reports the measured value to the base station through an air interface.

Step 47: The base station reports the measured value to the control device.

Step 48: The control device calculates a location of the UE according to the measured value.

Figure 8:
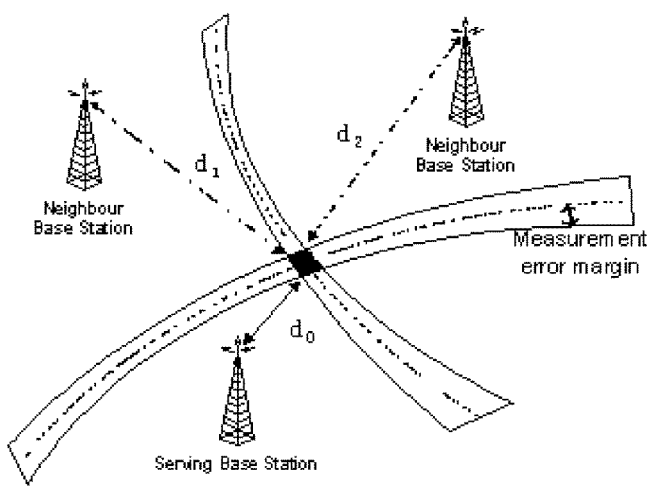
FIG. 8 is a schematic diagram of calculating, according to an OTDOA technology, a location of a UE provided in Embodiment 6 of the present invention.

In this embodiment, the control device calculates the location of the UE according to an observed time difference of arrival OTDOA positioning algorithm. A specific calculation process is described in detail as follows:

OTDOA is a common positioning technology, and was once used in a terrestrial wireless access system of a Universal Mobile Telecommunications System (Universal Mobile Telecommunications System, UMTS). Its principle is that when three or more eNBs exist in a system, a location of a UE can be determined according to a time difference of arrival of downlink transmission signals between different eNBs. The downlink transmission signal may be a reference signal, or a synchronization signal. As can be seen from a definition of a hyperbolic curve, a hyperbolic curve includes points whose difference of distances to two fixed points is a constant value. As shown in FIG. 8, a hyperbolic curve includes points whose difference of distances to an eNB0 and to an eNB1 is $d_1-d_0$, another hyperbolic curve includes points whose difference of distances to the eNB1 and to an eNB2 is $d_2-d_1$, and an intersecting point of the two hyperbolic curves is the location of the UE. When more eNBs exist in the system, the determined location of the UE is more precise.

In LTE, OTDOA positioning is used as a network-assisted UE positioning technology. After an evolved serving mobile location center e-SMLC on a network side specifies, for an eNB and a UE, transmit and receive configuration of a positioning reference signal PRS, the eNB sends the PRS through a downlink. The UE receives PRSs from multiple positioning eNBs, and identifies a first-arrival path location of each PRS to obtain a time difference of arrival RSTD of the PRSs between the different eNBs, and reports the RSTD to the e-SMLC. The e-SMLC receives, through the UE, a signal time difference of the different eNBs, and can map the signal time difference to a difference of distances between the UE and the different eNBs. Through mathematical computation with the foregoing hyperbolic curve model, the e-SMLC can obtain an accurate location of the UE. A merit of the OTDOA positioning is that positioning precision is relatively high (second only to GPS), and the OTDOA positioning may be applied to UE positioning of a non-line-of-sight network (in this case the GPS is unavailable or has a very large error).

Step 49: Send the location of the UE to the base station.

Step 50: The base station sends the location of the UE to the core network.

Embodiment 7

Figure 9:
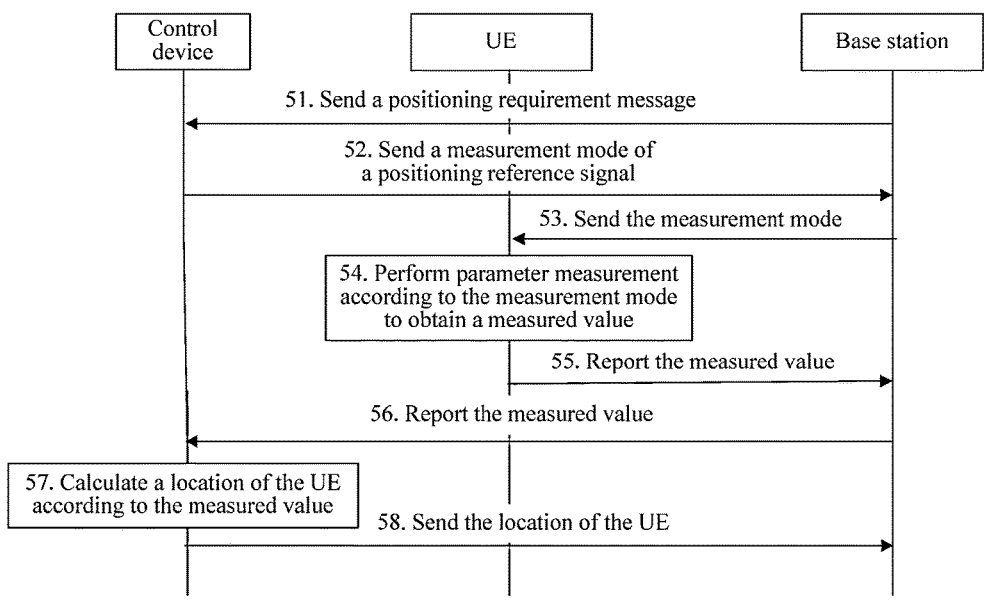
FIG. 9 is a flowchart of implementation of a positioning method provided in Embodiment 7 of the present invention.

FIG. 9 shows a flowchart of implementation of a positioning method provided in Embodiment 7 of the present invention. The method may be applied to a wireless communications system that includes mobile communication networks of various standards, the wireless communications system includes a UE and a core network, and the core network includes radio resource managers and base stations of various standards. The method is an OTDOA method based on an RRMS. A control device is an entity in the RRMS. Details are as follows.

Step 51: A base station sends a positioning requirement message to the control device.

Step 52: The control device sends a measurement mode of a positioning reference signal PRS to the base station.

Step 53: The base station sends the measurement mode to the UE to be positioned.

Step 54: The UE performs parameter measurement according to the measurement mode to obtain a measured value, where a measured parameter is a reference signal time difference RSTD.

Step 55: The UE reports the measured value to the base station through an air interface.

Step 56: The base station reports the measured value to the control device.

Step 57: The control device calculates a location of the UE according to the measured value.

Step 58: The control device sends the location of the UE to the base station.

Embodiment 8

Figure 10:
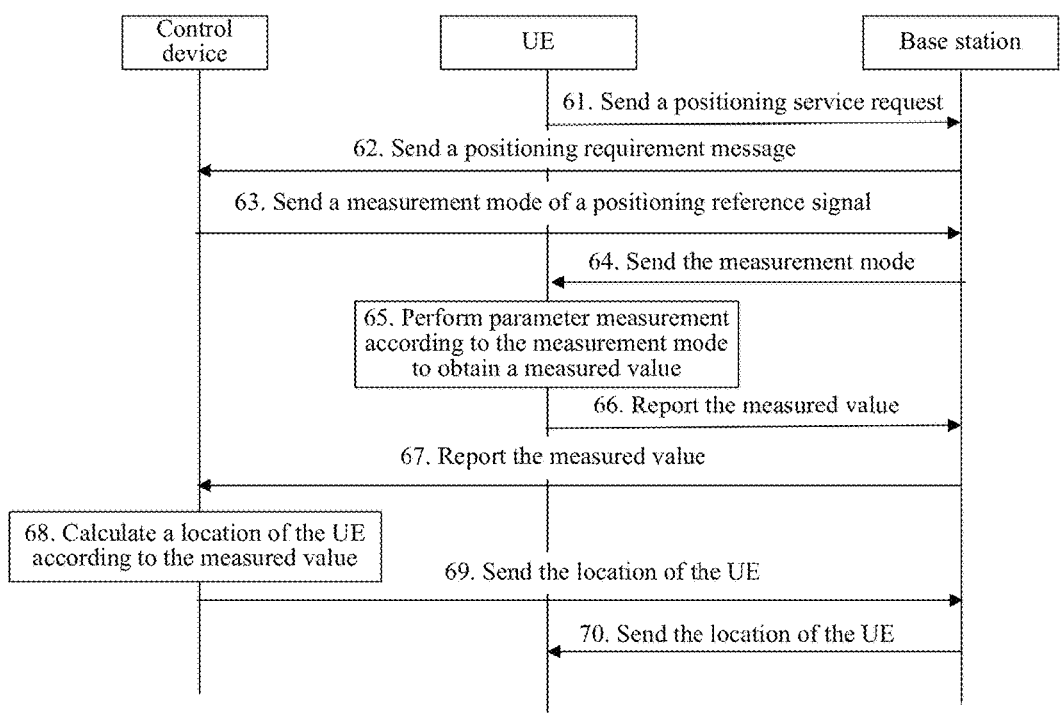
FIG. 10 is a flowchart of implementation of a positioning method provided in Embodiment 8 of the present invention.

FIG. 10 shows a flowchart of implementation of a positioning method provided in Embodiment 8 of the present invention. The method may be applied to a wireless communications system that includes mobile communication networks of various standards, the wireless communications system includes a UE and a core network, and the core network includes radio resource managers and base stations of various standards. The method is an OTDOA method based on an RRMS. A control device is an entity in the RRMS. Details are as follows.

Step 61: The UE sends a positioning service request to a base station.

Step 62: The base station sends a positioning requirement message to the control device.

Step 63: The control device sends a measurement mode of a positioning reference signal PRS to the base station.

Step 64: The base station sends the measurement mode to the UE to be positioned.

Step 65: The UE performs parameter measurement according to the measurement mode to obtain a measured value, where a measured parameter is a reference signal time difference RSTD.

Step 66: The UE reports the measured value to the base station through an air interface.

Step 67: The base station reports the measured value to the control device.

Step 68: The control device calculates a location of the UE according to the measured value.

Step 69: The control device sends the location of the UE to the base station.

Step 70: The base station sends the location of the UE to the UE.

In an exemplary embodiment of this embodiment, the UE needs to report capability information of OTDOA supported by the UE itself to the control device. The UE reports the capability information by using OTDOA-ProvideCapabilities signaling. A specific signaling format is as follows:

```
-- ASN1START
OTDOA-ProvideCapabilities ::= SEQUENCE {
    otdoa-Mode    BIT STRING {   ue-assisted (0) } (SIZE (1..8)),
```

```
...,
   supportedBandListEUTRA    SEQUENCE (SIZE (1..maxBands)) OF
SupportedBandEUTRA           OPTIONAL
}
maxBands INTEGER ::= 64
SupportedBandEUTRA ::= SEQUENCE {
   bandEUTRA                 INTEGER (1..64)}
SupportedBandUTRA ::= SEQUENCE {
   bandUTRA                  INTEGER (1..32)}
SupportedBandGERAN ::= SEQUENCE {
   bandGERAN                 INTEGER (1..32)}
-- ASN1STOP
``` where SupportedBandUTRA is bandwidth support information; bandUTRA, which is newly added as compared with original signaling, indicates UTRA bandwidths supported by the UE; and newly-added bandGERAN indicates GERAN bandwidths supported by the UE. In another exemplary embodiment of the present invention, the control device delivers auxiliary data information about a reference cell to the UE, so as to indicate corresponding positioning signal information for guiding the UE to perform positioning measurement. Specifically, the control device delivers the auxiliary data information about the reference cell to the UE by using OTDOA-ReferenceCellInfo signaling.

A format of the OTDOA-ReferenceCellInfo signaling is shown as follows:

```
-- ASN1START
OTDOA-ReferenceCellInfo ::= SEQUENCE {
   physCellId           INTEGER (0..503),
   cellGlobalId         ECGI                 OPTIONAL,     --
Need ON
earfcnRef              ARFCN-ValueEUTRA     OPTIONAL,     --
Cond NotSameAsServ0
earfcnRef              ARFCN-ValueUTRA      OPTIONAL,     --
Cond NotSameAsServ0
earfcnRef              ARFCN-ValueGERAN     OPTIONAL,     --
Cond NotSameAsServ0
   antennaPortConfig   ENUMERATED {ports1-or-2, ports4, ... }
                                             OPTIONAL,     --
Cond NotSameAsServ1
   cpLength            ENUMERATED { normal, extended, ... },
   prsInfo             PRS-Info             OPTIONAL,     --
Cond PRS
   ...
}
-- ASN1STOP
``` where ARFCN-ValueUTRA, which is newly added as compared with the original signaling, is an absolute frequency indicator of a UTRA system for the reference cell; and ARFCN-ValueGERAN is an absolute frequency indicator of a GERAN system for the reference cell. In addition, the control device or a coordination controller Coordinator delivers auxiliary data information about a neighboring cell to the UE, so as to indicate corresponding positioning signal information for guiding the UE to perform the positioning measurement. Specifically, the control device delivers the auxiliary data information about the neighboring cell to the UE by using OTDOA-NeighbourCellInfoList signaling.

A format of the OTDOA-NeighbourCellInfoList signaling is shown as follows:

```
-- ASN1START
OTDOA-NeighbourCellInfoList ::= SEQUENCE (SIZE (1..maxFreqLayers)) OF
OTDOA-NeighbourFreqInfo
OTDOA-NeighbourFreqInfo ::= SEQUENCE (SIZE (1..24)) OF OTDOA-
NeighbourCellInfoElement
OTDOA-NeighbourCellInfoElement ::= SEQUENCE {
   physCellId           INTEGER (0..503),
   cellGlobalId         ECGI                  OPTIONAL,     --
Need ON
   earfcn               ARFCN-ValueEUTRA OPTIONAL,         -
- Cond
      earfcn            ARFCN-ValueUTRA   OPTIONAL,
   -- Cond
      earfcn            ARFCN-ValueGERAN OPTIONAL,
   -- Cond
NotSameAsRef0
   cpLength             ENUMERATED {normal, extended, ...}
                                              OPTIONAL,     --
Cond NotSameAsRef1
   prsInfo              PRS-Info              OPTIONAL,     --
```

-continued

```
Cond NotSameAsRef2
   antennaPortConfig        ENUMERATED {ports-1-or-2, ports-4, ...}
                                                   OPTIONAL,        --
Cond NotsameAsRef3
   slotNumberOffset         INTEGER(0..31)         OPTIONAL,        -
- Cond NotSameAsRef4
   prs-SubframeOffset       INTEGER (0..1279)      OPTIONAL,        -
- Cond InterFreq
   expectedRSTD             INTEGER (0..16383),
   expectedRSTD-Uncertainty INTEGER (0..1023),
   ...
}
maxFreqLayers   INTEGER ::= 3
-- ASN1STOP
``` where ARFCN-ValueUTRA, which is newly added as compared with the original signaling, is the absolute frequency indicator of the UTRA system for the reference cell; and ARFCN-ValueGERAN is the absolute frequency indicator of the GERAN system for the reference cell. Specifically, signaling for the UE to report an RSTD measurement result to the control device is OTDOA-SignalMeasurementInformation.

A format of the signaling is as follows:

```
OTDOA-SignalMeasurementInformation ::= SEQUENCE {
    systemFrameNumber    BIT STRING (SIZE (10)),
    physCellIdRef        INTEGER (0..503),
    cellGlobalIdRef      ECGI                         OPTIONAL,
    earfcnRef            ARFCN-ValueEUTRA             OPTIONAL,
        earfcnRef        ARFCN-ValueUTRA              OPTIONAL,
        earfcnRef        ARFCN-ValueGERAN             OPTIONAL,
    referenceQuality     OTDOA-MeasQuality            OPTIONAL,
    neighbourMeasurementList NeighbourMeasurementList,
    ...
}
NeighbourMeasurementList ::= SEQUENCE (SIZE(1..24)) OF
NeighbourMeasurementElement
```

-continued

```
NeighbourMeasurementElement ::= SEQUENCE {
    physCellIdNeighbor       INTEGER (0..503),
    cellGlobalIdNeighbour ECGI                       OPTIONAL,
    earfcnNeighbour          ARFCN-ValueEUTRA        OPTIONAL,
        earfcnNeighbour      ARFCN-ValueUTRA         OPTIONAL,
        earfcnNeighbour      ARFCN-ValueGERAN        OPTIONAL,
    rstd                     INTEGER (0..12711),
    rstd-Quality             OTDOA-MeasQuality,
    ...
}
-- ASN1STOP
``` where the newly-added ARFCN-ValueUTRA indicates the absolute frequency indicator of the UTRA system for the reference cell; the ARFCN-ValueGERAN indicates the absolute frequency indicator of the GERAN system for the reference cell; ARFCN-ValueUTRA indicates an absolute frequency indicator of the UTRA system for the neighboring cell; and ARFCN-ValueGERAN indicates an absolute frequency indicator of the GERAN system for the neighboring cell.

Specifically, signaling for the UE to report its cell information to the control device is shown in the following table:

| IE/Group Name | Presence | Range | IE type and reference | Semantics description |
|---|---|---|---|---|
| OTDOA Cell Information | | 1 ... <maxnoOTDOAtypes> | | |
| >CHOICE OTDOA Cell Information Item | M | | | |
| >>PCI | M | | INTEGER (0 ... 503, ...) | Physical Cell ID |
| >>Cell ID | M | | ECGI 9.2.6 | |
| >>TAC | M | | OCTET STRING(2) | Tracking Area Code |
| >>EARFCN | M | | | Here, the signaling should include bands of EUTRAN, UTRAN, and GERAN. |
| >>PRS Bandwidth | M | | ENUMERATED (bw6, bw15, bw25, bw50, bw75, bw100, ...) | Transmission bandwidth of PRS |
| >>PRS Configuration Index | M | | INTEGER (0. . . 4095, ...) | PRS Configuration Index, ref TS 36.211 [6] |
| >>CP Length | M | | ENUMERATED (Normal, Extended, ...) | Cyclic prefix length of the PRS |
| >>Number of DL Frames | M | | ENUMERATED (sf1, sf2, sf4, sf6, ...) | Number of consecutive downlink subframes $N_{PRS}$ with PRS, ref TS 36.211 [6] |

-continued

| IE/Group Name | Presence | Range | IE type and reference | Semantics description |
| --- | --- | --- | --- | --- |
| >>Number of Antenna Ports | M | | ENUMERATED(n1-or-n2, n4, . . .) | Number of used antenna ports, where n1-or-n2 corresponds to 1 or 2 ports, n4 corresponds to 4 ports |
| >>SFN Initial-isation Time | M | | BIT STRING (64) | Time in seconds relative to 00:00:00 on 1 Jan. 1900 where binary en-coding of the in-teger part is in the first 32 bits and binary encoding of the fraction part in the last 32 bits. The fraction part is ex-pressed with a gran-ularity of $½**32$ second. |
| >>E-UTRAN Access Point Position | M | | 9.2.8 | The configured estimated geographical position of the antenna of the cell. |
| >>PRS Muting Configuration | M | | 9.2.9 | The configuration of positioning reference signals muting pattern, when applicable | where newly-added EARFCN includes the bands of the EUTRAN, UTRAN, and GERAN.

In Embodiments 6, 7, and 8 of the present invention, a core network, a base station, or a UE may initiate a positioning request, so as to command the UE to perform RSTD measurement; and finally, a control device positions the UE according to an RSTD value fed back by the base station. In this way, a positioning manner is diversified, a wide range of scenarios are applicable, and an OTDOA method based on an RRMS is suitable.

Embodiment 9

Figure 11:
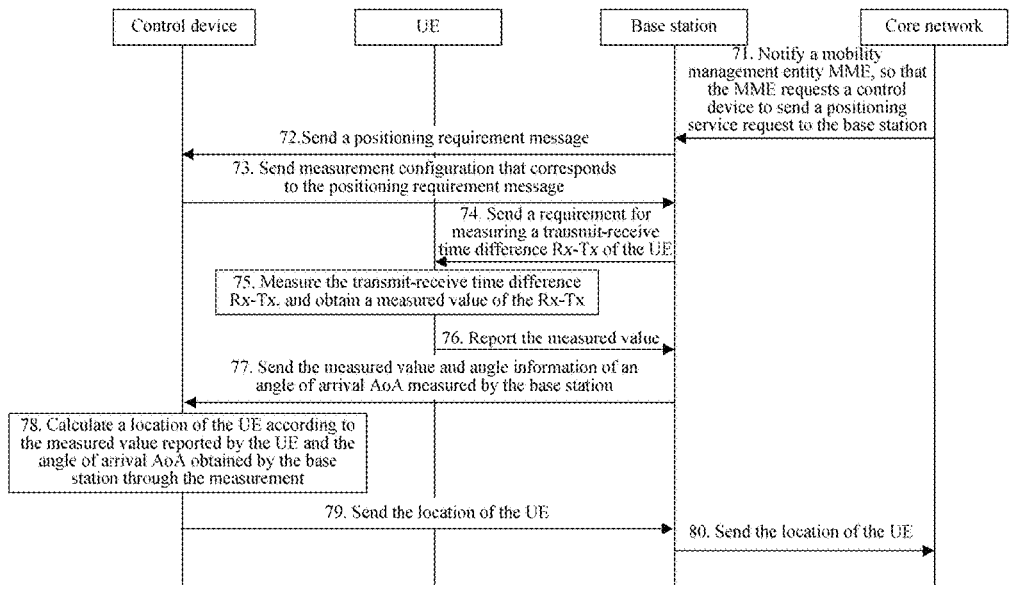
FIG. 11 is a flowchart of implementation of a positioning method provided in Embodiment 9 of the present invention.

FIG. 11 shows a flowchart of implementation of a positioning method provided in Embodiment 9 of the present invention. The method may be applied to a wireless communications system that includes mobile communication networks of various standards, the wireless communications system includes a UE and a core network, and the core network includes radio resource managers and base stations of various standards. The method is an Rx-Tx positioning method based on an RRMS. A control device is an entity in the RRMS. Details are as follows:

Step 71: The core network notifies a mobility management entity MME, and the MME requests the control device to send a positioning service request to a base station.

Step 72: The base station sends a positioning requirement message to the control device.

Step 73: The control device sends measurement configuration to the base station that participates in positioning, where the measurement configuration corresponds to the positioning requirement message.

In this embodiment, the measurement configuration indicates that a measured parameter is a transmit-receive time difference Rx-Tx of the UE.

Step 74: The base station sends a requirement for measuring the transmit-receive time difference Rx-Tx of the UE to the UE to be positioned.

Step 75: The UE measures the transmit-receive time difference Rx-Tx, and obtains a measured value of the Rx-Tx.

In this embodiment, a difference between a receiving moment of a downlink reference signal and a receiving moment of an uplink reference signal in a same subframe of the UE is measured, and the difference is the measured value of the Rx-Tx.

Step 76: The UE reports the measured value to the base station through an air interface.

Step 77: The base station sends the measured value reported by the UE and angle information of an angle of arrival AoA measured by the base station itself to the control device.

In this embodiment, the base station estimates an angle-of-arrival direction of the uplink reference signal of the UE according to the uplink reference signal of the UE.

Step 78: The control device calculates a location of the UE according to the measured value reported by the UE and the angle of arrival AoA obtained by the base station through the measurement.

In this embodiment, specifically, the location of the UE may be calculated according to an enhanced cell identity e-CID positioning algorithm. A specific process is described in detail as follows:

Currently, cell identity (Cell Identity, CID) positioning is a positioning manner often used and very easy to implement in cellular mobile communications, and is also called cell of origin (Cell of Origin, COO) positioning or cell global identity (Cell Global Identity, CGI) positioning. A main idea of its algorithm is that a geographical location of a UE is represented according to an identity ID of a cell in which the UE resides. According to an identity ID of an eNB on a cellular network, a network side can learn the eNB and geographical information about the eNB; therefore, uniqueness of a cell ID becomes a vital factor. In the CID method, generally a global identity CGI of a cell is used as a flag that uniquely identifies the cell.

As long as a CGI of a serving eNB that corresponds to a UE is found and it is considered that the served UE always falls within coverage of the serving eNB, by querying corresponding information of the eNB that corresponds to the CGI in a network-side database, a geographical location of the eNB can be utilized to roughly represent an activity area of the UE. The CID positioning is a positioning method most convenient, simplest, and easiest to implement in cellular mobile positioning, but is also a method with lowest positioning precision. Obviously, its positioning precision depends on density of a cellular eNB. The smaller a cell radius, the higher the positioning precision.

Figure 12:
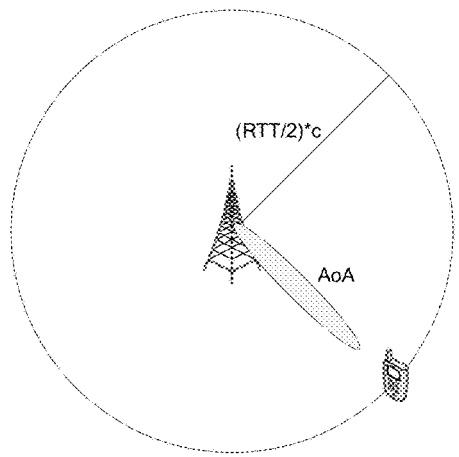
FIG. 12 is a schematic diagram of calculating, according to an enhanced cell identity e-CID positioning algorithm, a location of a UE provided in Embodiment 9 of the present invention.

In a current e-CID method, estimation of angle information of an angle of arrival (AoA), estimation of the Rx-Tx of the UE, estimation of a Rx-Tx of the eNB, and the like are added on a basis of the CID. The e-CID method is an enhancement of a traditional CID algorithm, but it also requires a cost of a hardware upgrade, such as an upgrade of an antenna of the eNB. RTT time can be obtained by adding up the Rx-Tx of the UE and the Rx-Tx of the eNB, and certainly a straight-line distance from the UE to the eNB can be obtained through the calculation. In this way, a circle may be determined, where the eNB serves as a center of the circle, and a point on the circle may be determined as the location of the UE by estimating an angle of arrival of an uplink signal of the UE, as shown in FIG. 12.

Step 79: Send the location of the UE to the base station.

Step 80: The base station sends the location of the UE to the core network.

Specifically, the UE reports a positioning measurement result to the control device by using ECID-SignalMeasurementInformation signaling, where a format of the ECID-SignalMeasurementInformation signaling is as follows:

```
-- ASN1START
ECID-SignalMeasurementInformation ::= SEQUENCE {
    primaryCellMeasuredResults    MeasuredResultsElement OPTIONAL,
    measuredResultsList           MeasuredResultsList,
    ...
}
MeasuredResultsList ::= SEQUENCE (SIZE(1..32)) OF
MeasuredResultsElement
MeasuredResultsElement ::= SEQUENCE {
    physCellId       INTEGER (0..503),
    cellGlobalId     CellGlobalIdEUTRA-AndUTRA-AndGERAN
OPTIONAL,
(GREAN is added on a basis of the original cell global identity.)
    arfcnEUTRA       ARFCN-ValueEUTRA,
systemFrameNumber
                     BIT STRING (SIZE (10))      OPTIONAL,
    rsrp-Result      INTEGER (0..97)             OPTIONAL,
    rsrq-Result      INTEGER (0..34)             OPTIONAL,
    ue-RxTxTimeDiff  INTEGER (0..4095)           OPTIONAL,
    RSSI-Result      INTEGER (0..63)             OPTIONAL,
    RSCP-Result      INTEGER (-5..91)            OPTIONAL,
    EcNo-Result      INTEGER (0..49)             OPTIONAL,
(Signaling on the right of a measurement result shown above indicates a
value range of the measurement result to be reported.)
    ...
}
-- ASN1STOP
``` where newly-added RSSI-Result indicates an RSSI measurement result, RSCP-Result indicates an RSCP measurement result, and EcNo-Result indicates an Ec/No measurement result.

Specifically, signaling ECID-RequestLocationInformation sent by the control device to the UE to request the UE to perform eCID positioning measurement includes eight bits, and each bit represents relevant measurement that the control device requests the UE to perform.

```
-- ASN1START
ECID-RequestLocationInformation::= SEQUENCE {
    requestedMeasurements    BIT STRING {   rsrpReq    (0),
                                            rsrqReq    (1),
                                            rssiReq    (2)
                                            rscpReq    (3)
                                            ecnoReq    (4)
                                            ueRxTxReq  (5) } (SIZE(1..8)),
    ...
}
-- ASN1STOP
``` where newly-added rssiReq indicates an RSSI measurement request (indicated by a bit numbered 2), rscpReq indicates an RSCP measurement request (indicated by a bit numbered 3), and ecnoReq indicates an Ec/No measurement request (indicated by a bit numbered 4).

In addition, the UE reports its own eCID measurement capability to the control device by using ECID-ProvideCapabilities signaling, and a format of the signaling is as follows:

```
-- ASN1START
ECID-ProvideCapabilities ::= SEQUENCE {
    ecid-MeasSupported  BIT STRING {  rsrpSup    (0),
                                      rsrqSup    (1),
                                      rssiSup    (2)
                                      rscpSup    (3)
                                      ecnoSup    (4)
                                      ueRxTxSup(5) } (SIZE(1..8)),
    ...
}
-- ASN1STOP
``` where newly-added rssiSup is used to notify the network of RSSI measurement capability supported by the UE, rscpSup is used to notify the network of RSCP measurement capability supported by the UE, and ecnoSup is used to notify the network of ecnoSup measurement capability supported by the UE.

In addition, the UE may further provide the control device with an error cause during the eCID measurement, and this is specifically implemented by using ECID-TargetDeviceErrorCauses signaling. A format of the signaling is as follows:

```
-- ASN1START
ECID-TargetDeviceErrorCauses ::= SEQUENCE {
    cause    ENUMERATED { undefined,
                          requestedMeasurementNotAvailable,
                          notAllrequestedMeasurementsPossible,
                          ...
                        },
    rsrpMeasurementNotPossible         NULL    OPTIONAL,
    rsrqMeasurementNotPossible         NULL    OPTIONAL,
    rssiMeasurementNotPossible         NULL    OPTIONAL,
RSSI measurement error cause indication
    rscpMeasurementNotPossible         NULL    OPTIONAL,
RSCP measurement error cause indication
    ecnoMeasurementNotPossible                 NULL    OPTIONAL,
Ec/No measurement error cause indication
    ueRxTxMeasurementNotPossible       NULL    OPTIONAL,
    ...
}
-- ASN1STOP
``` where rssiMeasurementNotPossible represents RSSI measurement error cause indication, rscpMeasurementNotPossible represents RSCP measurement error cause indication, and ecnoMeasurementNotPossible represents Ec/No measurement error cause indication.

In addition, CellGlobalIdEUTRA-AndUTRA signaling represents cell global identity information of 2G, 3G, or even 4G. A format of the signaling is as follows:

```
-- ASN1START
CellGlobalIdEUTRA-AndUTRA ::= SEQUENCE {
   plmn-Identity    SEQUENCE {
                mcc    SEQUENCE (SIZE (3))  OF INTEGER (0..9),
                mnc    SEQUENCE (SIZE (2..3)) OF INTEGER (0..9)
   },
   cellIdentity  CHOICE {
     eutra  BIT STRING (SIZE (28)),
     utraBIT STRING (SIZE (32))
     egran  BIT STRING (SIZE (32))
```

A cell identity of a GREAN network is added, and the identity consists of 32 bits.
   },
   ...
} where newly-added egran indicates a cell identity of a GREAN network, and the identity consists of 32 bits.

Specifically, the base station reports an eCID measurement quantity to the control device. This measurement quantity originates from a measurement result reported by the UE. After performing summarization, the eNB reports the measurement quantity as measurement results to the control device. Specifically, a form of each reported measurement result is shown in the following table:

| IE/Group Name | Presence | Range | IE Type and Reference | Semantics Description |
|---|---|---|---|---|
| Serving Cell ID | M | | ECGI 9.2.6 | E-UTRAN Cell Global Identity of the serving cell |
| Serving Cell TAC | M | | OCTET STRING(2) | Tracking Area Code of the serving cell |
| E-UTRAN Access Point Position | O | | 9.2.8 | The configured estimated geographical position of the antenna of the cell. |
| Measured Results | | 0 . . . <maxnoMeas> | | |
| >CHOICE Measured Results Value | M | | | |
| >>Value Angle of Arrival | M | | INTEGER (0 . . . 719) | According to mapping in TS 36.133 [8] |
| >>Value Timing Advance Type 1 | M | | INTEGER (0 . . 7690) | According to mapping in TS 36.133 [8] |
| >>Value Timing Advance Type 2 | M | | INTEGER (0 . . 7690) | According to mapping in TS 36.133 [8] |
| >>Result RSRP | | 1 . . . <maxCellReport> | | |
| >>>PCI | M | | INTEGER (0 . . . 503, . . .) | Physical Cell Identity of the reported cell |
| >>>EARFCN | M | | INTEGER (0 . . . 65535, . . .) | Corresponds to NDL for FDD and NDL/UL for TDD in ref. TS 36.104 [5] |
| >>>ECGI | O | | ECGI 9.2.6 | E-UTRAN Cell Global Identity of the reported cell |
| >>>Value RSRP | M | | INTEGER (0 . . . 97, . . .) | |
| >>Result RSRQ | | 1 . . . <maxCellReport> | | |
| >>>PCI | M | | INTEGER (0. . . 503, . . .) | Physical Cell Identity of the reported cell |
| >>>EARFCN | M | | INTEGER (0 . . . 65535, . . .) | Corresponds to NDL for FDD and NDL/UL for TDD in ref. TS 36.104 [5] |
| >>>ECGI | O | | ECGI 9.2.6 | E-UTRAN Cell Global Identity of the reported cell |
| >>>Value RSRQ | M | | INTEGER (0 . . . 34, . . .) | |
| >>Result RSCP | | | | |
| >>>PCI | M | | INTEGER (0 . . . 503, . . .) | Physical cell ID |
| >>>EARFCN | M | | INTEGER (0 . . . 65535, . . .) | Absolute frequency number |
| >>>ECGI | O | | ECGI 9.2.6 | Cell global ID |
| >>Result RSSI | | | | |
| >>>PCI | M | | INTEGER (0 . . . 503, . . .) | Physical cell ID |
| >>>EARFCN | M | | INTEGER (0 . . . 65535, . . .) | Absolute frequency number |

-continued

| IE/Group Name | Presence | Range | IE Type and Reference | Semantics Description |
|---|---|---|---|---|
| >>>ECGI | O | | ECGI 9.2.6 | Cell global ID |
| >>Result EcN0 | | | | |
| >>>PCI | M | | INTEGER (0 . . . 503, . . .) | Physical cell ID |
| >>>EARFCN | M | | INTEGER (0 . . . 65535, . . .) | Absolute frequency number |
| >>>ECGI | O | | ECGI 9.2.6 | Cell global ID |
| >>Result BSIC | | | | |
| >>>PCI | M | | INTEGER (0 . . . 503, . . .) | Physical cell ID |
| >>>EARFCN | M | | INTEGER (0 . . . 65535, . . .) | Absolute frequency number |
| >>>ECGI | O | | ECGI 9.2.6 | Cell global ID | where RSCP, RSSI, EcN0, and BSIC are newly added, and each parameter includes three items: PCI, EARFCN, and ECGI.

In addition, the control device may send signaling for requesting an eCID measurement result to the base station, and the base station requests a target UE to perform eCID measurement after receiving the signaling. Parameters included in a specific measurement result are shown in the following table:

Step 81: A base station sends a positioning requirement message to the control device.

Step 82: The control device sends measurement configuration to the base station that participates in positioning, where the measurement configuration corresponds to the positioning requirement message.

Step 83: The base station that participates in the positioning sends a requirement for measuring a transmit-receive time difference Rx-Tx of the UE to the UE to be positioned.

| IE/Group Name | Presence | Range | IE type and reference | Semantics description | Criticality | Assigned Criticality |
|---|---|---|---|---|---|---|
| Message Type | M | | 9.2.3 | | YES | reject |
| LPPa Transaction ID | M | | 9.2.4 | | — | |
| E-SMLC Measurement ID | M | | INTEGER (1 . . . 15, . . .) | | YES | reject |
| Report Characteristics | M | | ENUMERATED(OnDemand, Periodic, . . .) | | YES | reject |
| Measurement Periodicity | C-ifReportCharacteristicsPeriodic | | ENUMERATED(120 ms, 240 ms, 480 ms, 640 ms, 1024 ms, 2048 ms, 5120 ms, 10240 ms, 1 min, 6 min, 12 min, 30 min, 60 min, . . .) | | YES | reject |
| Measurement Quantities | | 1 . . . <maxnoMeas> | | | EACH | reject |
| >Measurement Quantities Item | M | | ENUMERATED (Cell-ID, Angle of Arrival, Timing Advance Type 1, Timing Advance Type 2, RSRP, RSRQ, RSCP, RSSI, EcN0, BSIC, . . .) | Measurement quantity type: cell ID, angle of arrival, timing (type 1), timing (type 2), RSRP, RSRQ, RSCP, or the like | — | — | where newly-added Measurement Quantities Item includes a type of the measurement quantity, such as cell ID, angle of arrival, timing (type 1), timing (type 2), RSRP, RSRQ, or RSCP.

Embodiment 10

Figure 13:
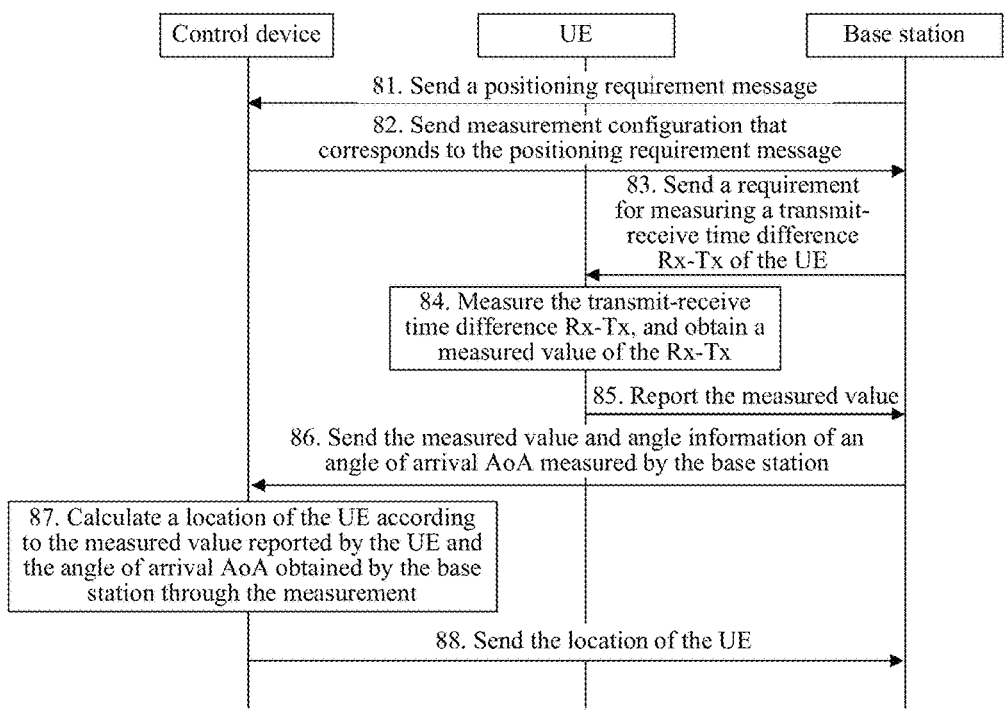
FIG. 13 is a flowchart of implementation of a positioning method provided in Embodiment 10 of the present invention.

FIG. 13 shows a flowchart of implementation of a positioning method provided in Embodiment 10 of the present invention. The method may be applied to a wireless communications system that includes mobile communication networks of various standards, the wireless communications system includes a UE and a core network, and the core network includes radio resource managers and base stations of various standards. The method is an Rx-Tx positioning method based on an RRMS. A control device is an entity in the RRMS. Details are as follows.

Step 84: The UE measures the transmit-receive time difference Rx-Tx, and obtains a measured value of the Rx-Tx.

Step 85: The UE reports the measured value to the base station through an air interface.

Step 86: The base station sends the measured value reported by the UE and angle information of an angle of arrival AoA measured by the base station itself to the control device.

Step 87: The control device calculates a location of the UE according to the measured value reported by the UE and the angle of arrival AoA obtained by the base station through the measurement.

Step 88: The control device sends the location of the UE to the base station.

Embodiment 11

Figure 14:
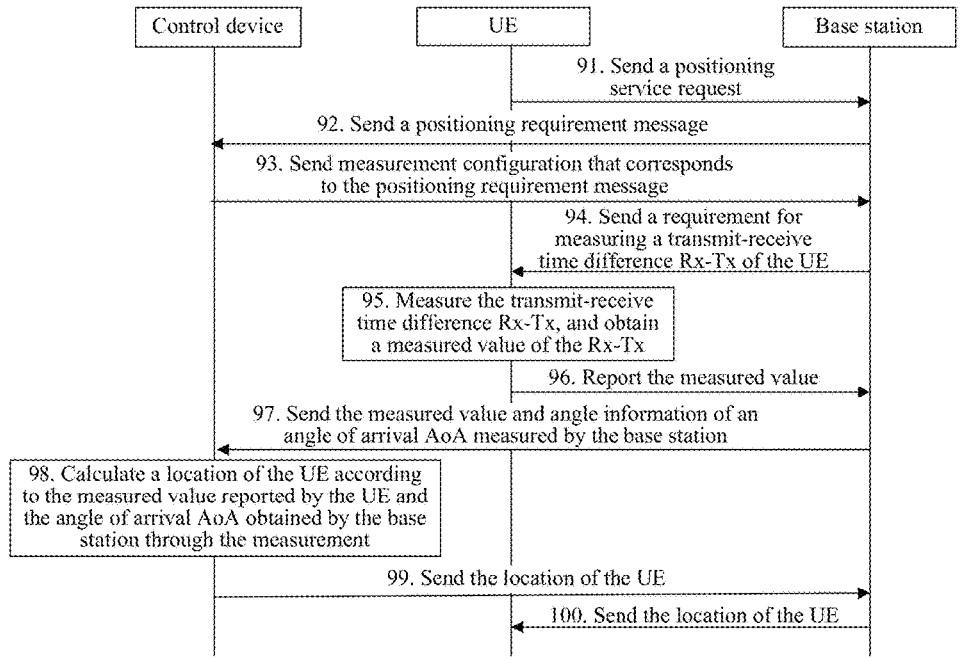
FIG. 14 is a flowchart of implementation of a positioning method provided in Embodiment 11 of the present invention.

FIG. 14 shows a flowchart of implementation of a positioning method provided in Embodiment 11 of the present invention. The method may be applied to a wireless communications system that includes mobile communication networks of various standards, the wireless communications system includes a UE and a core network, and the core network includes radio resource managers and base stations of various standards. The method is an Rx-Tx positioning method based on an RRMS. A control device is an entity in the RRMS. Details are as follows:

Step 91: The UE sends a positioning service request to a base station.

Step 92: The base station sends a positioning requirement message to the control device.

Step 93: The control device sends measurement configuration to the base station that participates in positioning, where the measurement configuration corresponds to the positioning requirement message.

In this embodiment, the measurement configuration indicates that a measured parameter is a transmit-receive time difference Rx-Tx of the UE.

Step 94: The base station that participates in the positioning sends a requirement for measuring the transmit-receive time difference Rx-Tx of the UE to the UE to be positioned.

Step 95: The UE measures the transmit-receive time difference Rx-Tx, and obtains a measured value of the Rx-Tx.

Step 96: The UE reports the measured value to the base station through an air interface.

Step 97: The base station sends the measured value reported by the UE and angle information of an angle of arrival AoA measured by the base station itself to the control device.

Step 98: The control device calculates a location of the UE according to the measured value reported by the UE and the angle of arrival AoA obtained by the base station through the measurement.

Step 99: The control device sends the location of the UE to the base station.

Step 100: The base station sends the location of the UE to the UE.

In Embodiments 9, 10, and 11 of the present invention, a core network, a base station, or a UE may initiate a positioning request, so as to command the UE to perform Rx-Tx measurement; and finally, a control device positions the UE according to an Rx-Tx result and an angle of arrival AoA that are fed back by the base station. In this way, a positioning manner is diversified, a wide range of scenarios are applicable, and an Rx-Tx positioning method based on an RRMS is suitable.

Embodiment 12

Figure 15:
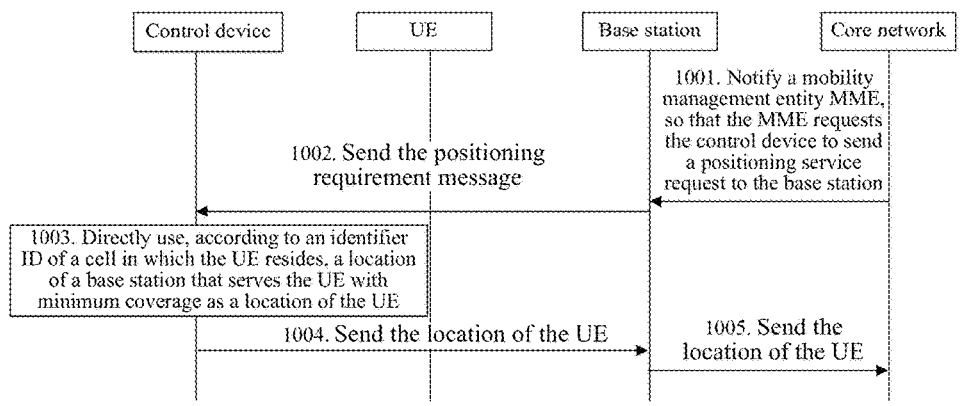
FIG. 15 is a flowchart of implementation of a positioning method provided in Embodiment 12 of the present invention.

FIG. 15 shows a flowchart of implementation of a positioning method provided in Embodiment 12 of the present invention. The method may be applied to a wireless communications system that includes mobile communication networks of various standards, the wireless communications system includes a UE and a core network, and the core network includes radio resource managers and base stations of various standards. The method is a CID positioning method based on an RRMS. A control device is an entity in the RRMS. Details are as follows:

Step 1001: The core network instructs, by using high-layer signaling, a mobility management entity MME to send a positioning service request, the MME requests the control device to send signaling to a base station, and the base station sends a positioning requirement message to the control device according to the signaling.

In this embodiment, the control device sends the positioning requirement message to the base station by using LPPa command signaling, and the base station sends the positioning requirement message to the control device according to the signaling.

Step 1002: The base station sends the positioning requirement message to the control device.

Step 1003: The control device directly uses, according to an identity ID of a cell in which the UE resides, a location of a base station that serves the UE with minimum coverage as a location of the UE.

In this embodiment, a measured value is not calculated and does not need to be reported by the UE. Because the control device in the RRMS knows types of base stations and also knows coverage of the deployed base stations, the control device can use a coordinate location of a base station that currently serves the UE as a coordinate location of the UE. On a cooperative network or in WCDMA, one UE may be served by multiple base stations simultaneously. Therefore, a coordinate location of a base station with minimum coverage is used as the coordinate location of the UE.

Step 1004: The control device sends the location of the UE to the base station.

Step 1005: The base station sends the location of the UE to the core network.

In this embodiment, a control device in a mobile communications system directly uses, according to an ID of a cell in which a UE resides, a location of a base station that serves the UE with minimum coverage as a location of the UE. When the location of the UE is calculated, only the UE and the control device need to interact with each other. Therefore, the parameters reported by the UE pass a same node without causing a time delay, so that precision of calculating the location of the UE is much higher as compared with the prior art.

Embodiment 13

Figure 16:
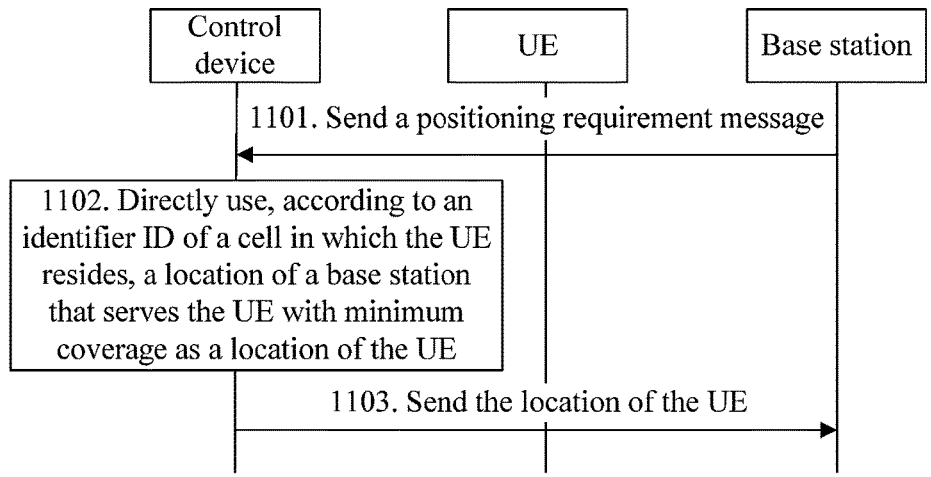
FIG. 16 is a flowchart of implementation of a positioning method provided in Embodiment 13 of the present invention.

FIG. 16 shows a flowchart of implementation of a positioning method provided in Embodiment 13 of the present invention. The method may be applied to a wireless communications system that includes mobile communication networks of various standards, the wireless communications system includes a UE and a core network, and the core network includes radio resource managers and base stations of various standards. The method is a CID positioning method based on an RRMS. A control device is an entity in the RRMS. Details are as follows:

Step 1101: A base station sends a positioning requirement message to the control device.

Step 1102: The control device directly uses, according to an identity ID of a cell in which the UE resides, a location of a base station that serves the UE with minimum coverage as a location of the UE.

Step 1103: The control device sends the location of the UE to the base station.

Embodiment 14

Figure 17:
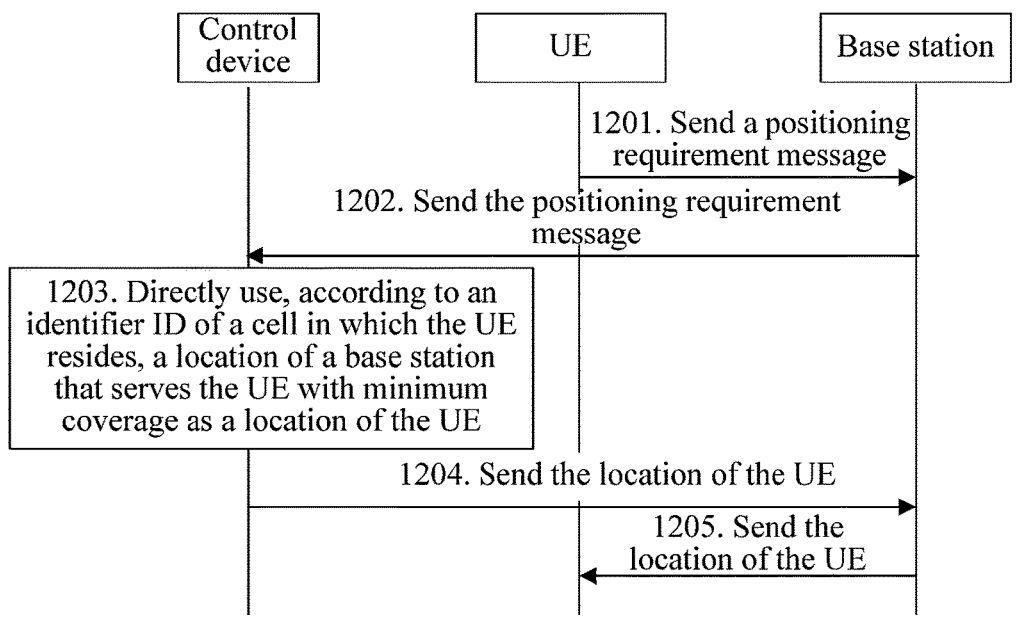
FIG. 17 is a flowchart of implementation of a positioning method provided in Embodiment 14 of the present invention.

FIG. 17 shows a flowchart of implementation of a positioning method provided in Embodiment 14 of the present invention. The method may be applied to a wireless communications system that includes mobile communication networks of various standards, the wireless communications system includes a UE and a core network, and the core network includes radio resource managers and base stations of various standards. The method is a CID positioning method based on an RRMS. A control device is an entity in the RRMS. Details are as follows:

Step 1201: The UE sends a positioning requirement message to a base station.

Step 1202: The base station sends the positioning requirement message to the control device.

Step 1203: The control device directly uses, according to an identity ID of a cell in which the UE resides, a location of a base station that serves the UE with minimum coverage as a location of the UE.

Step 1204: The control device sends the location of the UE to the base station.

Step 1205: The base station sends the location of the UE to the UE.

In Embodiments 12, 13, and 14 of the present invention, a core network, a base station, or a UE may initiate positioning, so that the control device directly uses, according to an identity ID of a cell in which the UE resides, a location of a base station that serves the UE with minimum coverage as a location of the UE. In this way, a positioning manner is diversified, a wide range of scenarios are applicable, and a CID positioning method based on an RRMS is suitable.

Embodiment 15

Figure 18:
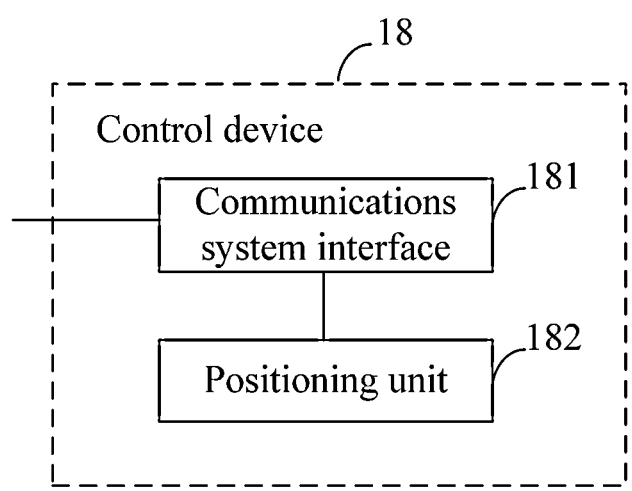
FIG. 18 is a specific structural block diagram of a control device provided in Embodiment 15 of the present invention.

FIG. 18 shows a specific structural block diagram of a control device 18 provided in Embodiment 15 of the present invention. For ease of description, only a part related to this embodiment of the present invention is shown. The control device may be an entity inside a radio resource management server RRMS, or a radio resource management server RRMS. The RRMS is connected to radio resource managers of networks of various standards, respectively, to form a mobile communications system that includes mobile communications networks of various standards. The control device 18 includes: a communications system interface 181 and a positioning unit 182.

The communications system interface 181 is connected to at least one communications system among N communications systems, and configured to receive a first positioning measurement parameter used for positioning a user equipment UE, where the first positioning measurement parameter is sent to the control device by one communications system or multiple communications systems among the N communications systems that communicate with the control device; an $i^{th}$ communications system interface among N communications system interfaces corresponds to an $i^{th}$ communications system among the N communications systems; the first positioning measurement parameter is a value of a positioning measurement parameter obtained by the UE through measurement, or the first positioning measurement parameter is a value of a positioning measurement parameter obtained by the UE through measurement and an AOA obtained by a base station through measurement; the first positioning measurement parameter may further be an identification of a base station that serves the UE, and the identification is reported by the UE, or may be a UE served by the base station and reported by the base station; and the control device directly uses, according to an ID of a cell in which the UE resides, a location of a base station that serves the UE with minimum coverage as a location of the UE.

The positioning unit 182 is configured to position the UE according to the first positioning measurement parameter that is received through the communications system interface.

In this embodiment, when the positioning measurement parameter obtained by the UE through the measurement includes reference signal received power RSRP, reference signal received quality RSRQ, received signal strength RSSI_UTRA of a 3G system, received signal code power RSCP, a signal-to-noise ratio Ec/No, a received signal strength indicator RSSI_GERAN of an enhanced data rate Global System for Mobile Communications GSM evolved network, a transmit-receive time difference (Rx-Tx)_GERAN of an enhanced data rate GSM evolved network, a UE transmit-receive time difference (Rx-Tx)_UTRA of a 3G system, a UE transmit-receive time difference (Rx-Tx)_EUTRA of an LTE system, and a UE transmit-receive time difference (Rx-Tx)_NG of a next-generation network, the positioning, by the control device, the UE according to the received first positioning measurement parameter is specifically: calculating, by the control device, the location of the UE according to a radio frequency pattern matching RFPM positioning algorithm.

When the positioning measurement parameter obtained by the UE through the measurement is a reference signal time difference RSTD, the positioning, by the control device, the UE according to the received first positioning measurement parameter is specifically: calculating, by the control device, the location of the UE according to an observed time difference of arrival OTDOA positioning algorithm.

When the positioning measurement parameter obtained by the UE through the measurement is a transmit-receive time difference (Rx-Tx) of the UE, the positioning, by the control device, the UE according to the received first positioning measurement parameter is specifically: calculating, by the control device, the location of the UE according to an enhanced cell identity e-CID positioning algorithm.

Further, the control device further includes: a UE interface and a signaling sending unit, where the UE interface is configured to receive a second positioning measurement parameter used for positioning the user equipment UE, the second positioning measurement parameter is sent to the control device by the UE that communicates with the control device, the second positioning measurement parameter is a value of a positioning measurement parameter obtained by the UE through measurement, and the signaling sending unit is configured to send signaling to the UE through the UE interface, so as to command the UE to measure the second positioning measurement parameter.

Further, the communications system includes a core network, a mobility management entity MME, and a base station; and the control device further includes: a first request receiving unit and a first signaling sending unit.

The first request receiving unit is configured to receive a request message sent by the mobility management entity MME, where the request message is sent by the core network to the MME by using high-layer signaling.

The first signaling sending unit is configured to send signaling to the base station according to the request message, so as to command the base station to instruct the UE to measure the first positioning measurement parameter.

Further, the communications system includes a core network and a base station; and the control device further includes: a first positioning requirement receiving unit and a measurement mode sending unit.

The first positioning requirement receiving unit is configured to receive a positioning requirement message sent by the base station, where the positioning requirement message is sent by the core network to the base station by using high-layer signaling.

The measurement mode sending unit is configured to send a measurement mode to the base station according to the positioning requirement message, so that the base station commands the UE to be positioned to measure a corresponding positioning measurement parameter according to the measurement mode.

Further, the communications system includes a core network, a mobility management entity MME, and a base station; and the control device further includes: a second request receiving unit, a second positioning requirement receiving unit, a second signaling sending unit, and a measurement configuration sending unit.

The second request receiving unit is configured to receive a positioning service request sent by the MME, where the positioning service request is sent by the core network to the MME by using high-layer signaling.

The second signaling sending unit is configured to send signaling to the base station according to the positioning service request.

The second positioning requirement receiving unit is configured to receive a positioning requirement message sent by the base station.

The measurement configuration sending unit is configured to send measurement configuration to the base station according to the positioning requirement message, so that the base station measures an angle of arrival AOA according to the measurement configuration, and at the same time the base station commands the UE to be positioned to measure a corresponding positioning measurement parameter according to the measurement configuration.

The control device provided in this embodiment of the present invention may be applied to the method Embodiment 1. For details, refer to the description in Embodiment 1, and no further details are provided herein.

It is worth noting that in the foregoing embodiments, various units included are classified only according to functions and logic, but the present invention is not limited to the classification as long as corresponding functions can be implemented. In addition, specific names of the functional units are used to distinguish each other only, but not intended to limit the protection scope of the present invention.

In addition, a person of ordinary skill in the art may understand that all or a part of the steps in the method embodiments may be performed by a program instructing relevant hardware. The corresponding program may be stored in a computer readable storage medium. The storage medium is an ROM/RAM, a magnetic disk, an optical disc, or the like.

The foregoing descriptions are merely exemplary embodiments of the present invention, but are not intended to limit the present invention. Any modifications, equivalent replacements, and improvements made within the spirit and principle of the present invention shall fall within the protection scope of the present invention.

What is claimed is:

1. A positioning method, comprising:
   receiving, by a device, a request message sent by a core network through a mobility management entity (MME) using high-layer signaling, wherein the device is directly connected to N communications systems through N communications systems interfaces, the N communications systems interfaces being comprised in the device, wherein each of the N communications systems operates according to a different communication standard, and wherein a first communication system of the N communications systems comprises the core network, the MME, and a base station;
   sending, by the device, signaling to the base station according to the request message, wherein the signaling commands the base station to instruct a user equipment (UE) to measure a first positioning measurement parameter for positioning the UE;
   receiving, by a device, the first positioning measurement parameter, wherein each of the N communications systems operates according to a different communication standard, wherein each of at least two communications systems interfaces of the N communications system interfaces receives the first positioning measurement parameter at least in part, and wherein the first positioning measurement parameter corresponds to a plurality of measurements made by the UE, and the plurality of measurements correspond to different communication systems; and
   positioning, by the device using a single positioning algorithm, the UE according to the first positioning measurement parameter that is received through the at least two communication systems interfaces.

2. The method according to claim 1, wherein, the method further comprises:
   sending, by the device, a measurement mode to the base station according to the positioning requirement message, so that the base station commands the UE to be positioned to measure a corresponding positioning measurement parameter according to the measurement mode.

3. The method according to claim 1, wherein the first positioning measurement parameter further comprises an angle of arrival obtained by the base station through measurement.

4. The method according to claim 1, wherein the device is a radio resource management server or a coordination controller.

5. The method according to claim 1, further comprising:
   receiving, by the device through a UE interface supported by the device, a second positioning measurement parameter used for positioning the UE, wherein the second positioning measurement parameter is directly sent to the device by the UE that communicates with the device, and the second positioning measurement parameter is a value of a positioning measurement parameter obtained by the UE through measurement, and the UE interface is a different interface than the at least two communications systems interfaces through which the first positioning measurement parameter is received.

6. The method according to claim 5, wherein before receiving the second positioning measurement parameter, the method further comprises sending, by the device through the UE interface, signaling to the UE, so as to command the UE to measure the second positioning measurement parameter.

7. A device, comprising:
   a processor; and
   a computer-readable storage medium storing a program to be executed by the processor; and
   N communications systems interfaces directly connected to N communications systems, wherein each of the N communications systems operates according to a different communication standard from others of the N communications systems, wherein a first communication system of the N communications systems comprises a core network, a mobility management entity (MME), and a base station, and wherein the N communications systems interfaces are configured to:
   receive a request message sent by the core network through the MME using high-layer signaling;
   send signaling to the base station according to the request message, wherein the signaling commands the base station to instruct the UE to measure a first positioning measurement parameter for positioning a user equipment (UE); and receive a first positioning measurement parameter wherein each of at least two communications systems interfaces of the N communications system interfaces receives the first positioning measurement parameter at least in part, and wherein the first positioning measurement parameter corresponds to a plurality of measurements made by the UE, and the plurality of measurements correspond to different communication systems;

wherein the program, when executed by the processor, instructs the processor to position the UE using a single positioning algorithm according to the first positioning measurement parameter that is received through the at least two communications system interfaces.

8. The device according to claim 7, further comprising a UE interface, configured to receive a second positioning measurement parameter used for positioning the UE, wherein the second positioning measurement parameter is sent to the device by the UE that communicates with the device, and the UE interface is a different interface than the at least two communications systems interfaces through which the first positioning measurement parameter is received.

9. The device according to claim 8, wherein the program, when executed by the processor, further instructs the processor to send signaling to the UE through the UE interface, so as to command the UE to measure the second positioning measurement parameter.

10. The device according to claim 7, wherein the N communications system interfaces are further configured to send a measurement mode to the base station, so that the base station commands the UE to be positioned to measure a corresponding positioning measurement parameter according to the measurement mode.

11. The device according to claim 7, wherein the device is a radio resource management server RRMS or a coordination controller.

* * * * *